T. C. WURTS.
ELECTRICAL SYSTEM.
APPLICATION FILED MAY 7, 1917.
1,363,633.
Patented Dec. 28, 1920.
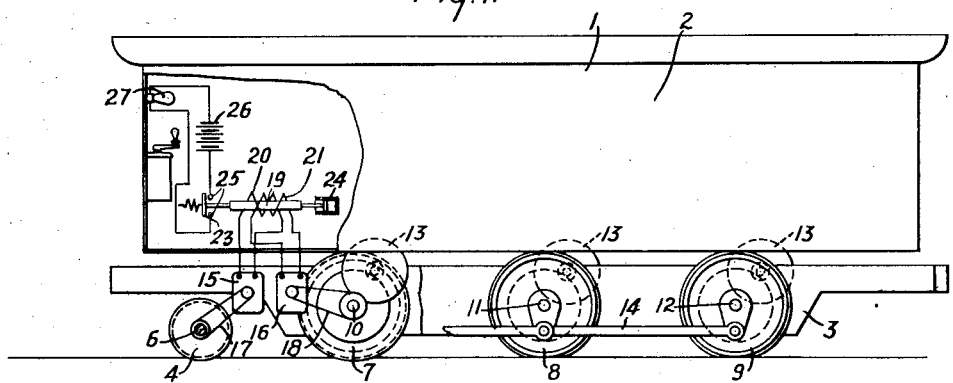
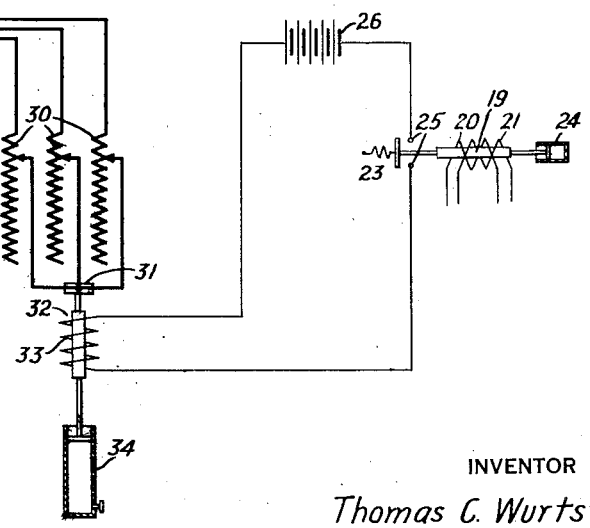
WITNESSES:
Fred. A. Lind.
Wayne B. Wells
INVENTOR
Thomas C. Wurts
BY
ATTORNEY

UNITED STATES PATENT OFFICE.

THOMAS C. WURTS, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL SYSTEM.

1,363,633.   Specification of Letters Patent.   Patented Dec. 28, 1920.

Application filed May 7, 1917. Serial No. 167,081.

*To all whom it may concern:*

Be it known that I, THOMAS C. WURTS, a citizen of the United States, and a resident of Pittsburgh, in the county of Allegheny and State of Pennsylvania, have invented a new and useful Improvement in Electrical Systems, of which the following is a specification.

My invention relates to electrical systems for vehicles and particularly to systems which serve to indicate the rotative condition of the driving wheels.

One object of my invention is to provide an electrical system for a locomotive that shall indicate all the changes in rotation of the driving wheels relative to the rotation of the guiding wheels.

Another object of my invention is to provide an electrical system of the above-indicated character that is equipped with a signal device which shall give an indication when the driving wheels of the vehicle are slipping, relative to the track, by reason of being rotated at an excessive speed or when the driving wheels are sliding, relative to the track, by reason of having an excessive braking power applied thereto.

Another object of my invention is to provide an electrical system of the above-indicated character that embodies a generator connected to the auxiliary wheels of the vehicle, a second generator connected to the driving wheels and a differential relay that is operated by said generators in accordance with changes of rotation of the driving wheels relative to the auxiliary wheels of the vehicle.

When a locomotive is accelerated at too rapid a rate, or when the braking power is applied too suddenly, the driving wheels will slip or slide along the track, thus injuring the moving parts of the locomotive by reason of the rapid movement thereof, or producing the so-called flat surfaces on the driving wheels.

In a locomotive constructed in accordance with my invention, a signal device is provided which gives an indication whenever the power for braking or for accelerating the locomotive is being applied at too rapid rate, in order that the driver of the locomotive may make necessary corrections to prevent the slipping or sliding of the driving wheels along the track.

In the accompanying drawing illustrating my invention, Figure 1 is a side elevational view of a locomotive provided with a system constructed in accordance with my invention and Fig. 2 is a diagrammatic view of a modification of my invention.

Referring to Fig. 1 of the drawing, a locomotive 1 is provided with a cab 2 and a running gear 3. The running gear 3 is provided with a pair of auxiliary guiding wheels 4 that are mounted on an axle 6, and with three pairs of driving wheels 7, 8 and 9 that are respectively mounted on axles 10, 11 and 12. The driving wheels 7, 8 and 9 are provided with propelling motors 13 and are connected by means of side-rods 14.

Two generators 15 and 16 are located between the auxiliary guiding wheels 4 and the driving wheels 7, and have the armatures thereof respectively connected to the axles 6 and 10 in any approved manner, as for example, by the flexible belts 17 and 18 that are illustrated in Fig. 1 of the drawing.

A differential relay 19 is provided with two coils 20 and 21, which are respectively connected to the generators 15 and 16, and with a core armature 22 that is mechanically connected to a contact member 23 and a dash-pot 24. The contact member 23 is adapted to bridge contact terminals 25 for completing a circuit from the battery 26 through an indicating device 27 when the relay 19 is operated.

The generators 15 and 16 are calibrated in order to equally energize the coils 20 and 21, which are of the same size but oppositely wound, when the auxiliary wheels 4 and the driving wheels 7, 8 and 9 are operating under normal conditions. Thus, when the locomotive is operating under normal conditions, the two coils 20 and 21 oppose and neutralize the action of each other, whereby the relay 19 is prevented from closing the circuit of the battery 26 through the indicating device 27.

However, in case the locomotive is accelerated at too rapid a rate, the driving wheel 7 slips on the track and the generator 16 is operated to supply the coil 21 with a greater amount of energy than is supplied to the coil 20 by the generator 15. Thus, the relay 19 is actuated to complete a circuit from the battery 26 through the indicating device 27. In case the vehicle is decelerated by means of dynamic-braking or by any other well-known means of braking, at a rate such as to cause the driving wheels to lock and slide along the track, then the speed of the generator 16 and the energization of the coil 21 are reduced to permit the operation of the relay 19 by the coil 20 to complete a circuit through the indicating device 27.

Thus, the relay 19, combined with the indicating device 27 and the generators 15 and 16, serves to notify the locomotive driver whenever acceleration or deceleration is being effected at too rapid a rate.

In Fig. 2 of the drawing is illustrated a system in which the differential relay 19 serves to control the speed of the motor that is adapted to accelerate the locomotive when supplied with energy and to decelerate the same when connected to effect dynamic-braking. The motor 13 embodies a primary winding 28 and a rotor or secondary winding 29 that is adapted to be short-circuited through the resistors 30. The differential relay 19 in the modification of my invention illustrated in Fig. 2 is adapted to complete a circuit from the battery 26 through the coil 33 of an electromagnet 32. The electromagnet 32 operates a contact member 31, which short-circuits the secondary winding 29 of the induction motor 13 after gradually excluding the resistors 30 from the circuit of the winding 29. A dash-pot 34 is associated with the electromagnet 32 for steadying the action thereof.

In case the locomotive is accelerated at too rapid a rate, the differential relay 19 will be operated to complete a circuit from the battery 26 through the coil 33 of the electromagnet 32 in a manner similar to that described in connection with Fig. 1. When the coil 33 is energized, the contact member 31 is operated to increase the portions of the resistors 30 that are included in the circuit of the secondary winding 29. Thus, the resistance of the circuit of the secondary winding 29 is increased in order that the rotor slip may be increased and the motor speed may be reduced.

In case the locomotive is being decelerated, the motor 13 being connected for regeneration or dynamic-braking, and the driving wheels slide along the track, then the differential relay 19 will be operated to energize the electromagnet 32 and increase the resistance in the secondary winding 29 of the induction motor 13. As the induction motor 13 is assumed to be connected to effect electric braking, the speed thereof will be decreased by increasing the resistance of the circuit of the secondary winding and, accordingly, sliding of the driving wheels on the track will be prevented.

Thus, the relay 19, combined with the electromagnet 32 and the resistors 30, serves to decrease the speed of the locomotive when accelerated at too rapid a rate and to increase the speed of the motor when the locomotive is being decelerated at too rapid a rate.

Modifications in the system and arrangement and location of parts may be made within the spirit and scope of my invention and such modifications are intended to be covered by the appended claims.

I claim as my invention:

1. In a vehicle, the combination with a plurality of auxiliary wheels and a plurality of driving wheels, of a plurality of generators connected to said wheels, and a relay operated by said generators under predetermined rotative conditions of said driving wheels.

2. In a vehicle, the combination with a plurality of auxiliary wheels and a plurality of driving wheels, of a differential relay and means for operating said relay in accordance with a change of rotation of said driving wheels relative to the auxiliary wheels.

3. In a vehicle, the combination with a plurality of auxiliary wheels, a plurality of driving wheels, and a plurality of generators connected to said wheels, of a differential relay governed by said relay in accordance with a change of rotation of said driving wheels relative to the auxiliary wheels.

4. In a vehicle, the combination with a plurality of auxiliary wheels, a plurality of driving wheels, a generator connected to said auxiliary wheels, and a second generator connected to said driving wheels, of a differential relay having two coils governed by said generators, and an electrical circuit governed by said relay in accordance with a change of rotation of said driving wheels relative to the auxiliary wheels.

5. In a vehicle, the combination with a plurality of auxiliary wheels, a plurality of driving wheels, a generator connected to said auxiliary wheels, and a second generator connected to said driving wheels, of a differential relay having two coils connected to and operated by said generators under predetermined rotative conditions of said driving wheels.

6. In a vehicle, the combination with a pair of driving wheels having a generator associated therewith and a pair of guiding wheels having a generator associated therewith, of a differential relay controlled by said generators, and an indicator governed by said relay.

7. In a vehicle, the combination with a pair of driving wheels having a generator connected thereto, and a pair of guiding wheels having a generator connected thereto, of a differential relay having the coils thereof severally connected to said generators, and a signal device governed by said relay in accordance with the rotative conditions of the driving wheels.

8. In a vehicle, the combination with a plurality of auxiliary wheels and a plurality of driving wheels, of means comprising generators associated with said wheels, a differential relay controlled by the generators, and a signal device operated by the relay for indicating any change of rotation of the driving wheels relative to the auxiliary wheels.

9. In a vehicle, the combination with a plurality of auxiliary wheels, and a plurality of driving wheels, of a signal device and means comprising a plurality of generators associated respectively with the auxiliary and the driving wheels for operating said signal device to indicate any change of rotation of the driving wheels relative to the auxiliary wheels.

10. In a vehicle having driving and auxiliary wheels adapted to operate on a track, a generator connected to the driving wheels, a second generator connected to the auxiliary wheels, a differential relay controlled by said generators, and means controlled by said differential relay for indicating the rotative condition of the driving wheels.

11. The combination with a device for imparting relative longitudinal motion between a longitudinally extending member and a power mechanism carrying at least two wheels engaging said member, said member forming the sole mechanical driving coupling between said wheels, of means for indicating when one of said wheels is slipping on said member, said means comprising a pair of differentially connected speedometers connected to said wheels.

In testimony whereof I have hereunto subscribed my name this 21st day of April, 1917.

THOMAS C. WURTS.